United States Patent
Meyer et al.

(10) Patent No.: US 8,095,748 B2
(45) Date of Patent: Jan. 10, 2012

(54) METHOD AND APPARATUS FOR SENDING DATA FROM MULTIPLE SOURCES OVER A COMMUNICATIONS BUS

(75) Inventors: James W. Meyer, Shoreview, MN (US); Kirsten Renick, St. Paul, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 12/847,801

(22) Filed: Jul. 30, 2010

(65) Prior Publication Data

US 2010/0299440 A1 Nov. 25, 2010

Related U.S. Application Data

(63) Continuation of application No. 10/688,461, filed on Oct. 17, 2003, now Pat. No. 7,779,212.

(51) Int. Cl.
 *G06F 13/16* (2006.01)
(52) U.S. Cl. ......... 711/154; 370/473; 711/105; 711/165
(58) Field of Classification Search .................. 711/154, 711/105, 165; 370/473
 See application file for complete search history.

(56) References Cited

U.S. PATENT DOCUMENTS

| | | | |
|---|---|---|---|
| 3,798,613 A | 3/1974 | Edstrom et al. |
| 5,423,019 A | 6/1995 | Lin |
| 5,448,577 A | 9/1995 | Wells et al. |
| 5,542,058 A | 7/1996 | Brown, III et al. |
| 5,553,258 A | 9/1996 | Godiwala et al. |
| 5,588,111 A | 12/1996 | Cutts, Jr. et al. |
| 5,600,579 A | 2/1997 | Steinmetz et al. |
| 5,669,000 A | 9/1997 | Jessen et al. |
| 5,726,918 A | 3/1998 | Giramma et al. |
| 5,758,113 A | 5/1998 | Peet, Jr. et al. |
| 5,758,188 A | 5/1998 | Appelbaum et al. |

(Continued)

FOREIGN PATENT DOCUMENTS

WO WO-9506285 A2 3/1995

(Continued)

OTHER PUBLICATIONS

"IEEE Standard for High-Bandwidth Memory Interface Based on Scalable Coherent Interface(SCI) Signaling Technology (RAMLink)", IEEE Std 1596.4-1996, Institute of Electrical and Electronics Engineers, Inc,, (Dec. 31, 1996).

(Continued)

*Primary Examiner* — Jae Yu
(74) *Attorney, Agent, or Firm* — Schwegman, Lundberg & Woessner, P.A.

(57) ABSTRACT

In a memory system, multiple memory modules communicate over a bus. Each memory module may include a hub and at least one memory storage unit. The hub receives local data from the memory storage units, and downstream data from one or more other memory modules. The hub assembles data to be sent over the bus within a data block structure, which is divided into multiple lanes. An indication is made of where, within the data block structure, a breakpoint will occur in the data being placed on the bus by a first source (e.g., the local or downstream data). Based on the indication, data from a second source (e.g., the downstream or local data) is placed in the remainder of the data block, thus reducing gaps on the bus. Additional apparatus, systems, and methods are disclosed.

20 Claims, 8 Drawing Sheets

U.S. PATENT DOCUMENTS

| | | |
|---|---|---|
| 5,768,567 A | 6/1998 | Klein et al. |
| 5,777,942 A | 7/1998 | Dosaka et al. |
| 5,809,253 A | 9/1998 | Gallagher et al. |
| 5,809,320 A | 9/1998 | Jain et al. |
| 5,832,418 A | 11/1998 | Meyer |
| 5,841,967 A | 11/1998 | Sample et al. |
| 5,867,733 A | 2/1999 | Meyer |
| 5,872,909 A | 2/1999 | Wilner et al. |
| 5,898,891 A | 4/1999 | Meyer |
| 5,956,741 A | 9/1999 | Jones |
| 5,966,306 A | 10/1999 | Nodine |
| 6,006,166 A | 12/1999 | Meyer |
| 6,058,492 A | 5/2000 | Sample et al. |
| 6,073,198 A | 6/2000 | Meyer et al. |
| 6,076,180 A | 6/2000 | Meyer |
| 6,115,747 A * | 9/2000 | Billings et al. ............ 709/231 |
| 6,131,079 A | 10/2000 | Smith |
| 6,170,078 B1 | 1/2001 | Erle et al. |
| 6,182,258 B1 | 1/2001 | Hollander |
| 6,188,975 B1 | 2/2001 | Gay |
| 6,223,238 B1 | 4/2001 | Meyer et al. |
| 6,321,289 B1 | 11/2001 | Engfer et al. |
| 6,323,511 B1 | 11/2001 | Marsh |
| 6,336,176 B1 | 1/2002 | Leyda |
| 6,356,953 B1 | 3/2002 | Meyer et al. |
| 6,378,047 B1 | 4/2002 | Meyer |
| 6,397,299 B1 | 5/2002 | Meyer |
| 6,401,151 B1 | 6/2002 | Hoffman |
| 6,425,048 B1 | 7/2002 | Kaganoi |
| 6,425,056 B2 | 7/2002 | Meyer |
| 6,446,164 B1 | 9/2002 | Nguyen et al. |
| 6,446,188 B1 | 9/2002 | Henderson |
| 6,477,634 B1 | 11/2002 | Comment |
| 6,490,671 B1 | 12/2002 | Frank et al. |
| 6,516,383 B1 | 2/2003 | Patra et al. |
| 6,529,999 B1 | 3/2003 | Keller et al. |
| 6,560,680 B2 | 5/2003 | Meyer |
| 6,571,204 B1 | 5/2003 | Meyer |
| 6,591,318 B1 | 7/2003 | Meyer et al. |
| 6,654,832 B1 | 11/2003 | Meyer et al. |
| 6,678,875 B2 | 1/2004 | Pajak et al. |
| 6,687,786 B1 | 2/2004 | Wong et al. |
| 6,707,693 B1 | 3/2004 | Ichiriu |
| 6,725,326 B1 | 4/2004 | Patra et al. |
| 6,812,726 B1 | 11/2004 | Ong |
| 6,912,672 B2 | 6/2005 | Ko et al. |
| 6,944,039 B1 | 9/2005 | Nataraj et al. |
| 6,957,299 B2 | 10/2005 | Villaret et al. |
| 6,970,816 B1 | 11/2005 | Bryan et al. |
| 6,971,109 B1 | 11/2005 | Williams et al. |
| 7,000,224 B1 | 2/2006 | Osborne, II et al. |
| 7,016,997 B2 | 3/2006 | Wu |
| 7,017,089 B1 | 3/2006 | Huse |
| 7,019,998 B2 | 3/2006 | Tran et al. |
| 7,343,447 B2 | 3/2008 | Stewart |
| 7,404,058 B2 | 7/2008 | Lo et al. |
| 7,779,212 B2 | 8/2010 | Meyer et al. |
| 2001/0016877 A1 | 8/2001 | Dancs et al. |
| 2001/0035845 A1 | 11/2001 | Zwern |
| 2001/0040827 A1 | 11/2001 | Dosaka et al. |
| 2001/0044872 A1 | 11/2001 | Meyer |
| 2002/0099909 A1 | 7/2002 | Meyer |
| 2002/0107929 A1 | 8/2002 | Soussin et al. |
| 2002/0144085 A1 | 10/2002 | Hiratsuka et al. |
| 2002/0167829 A1 | 11/2002 | Friedman et al. |
| 2003/0101307 A1 | 5/2003 | Gemelli et al. |
| 2003/0182498 A1 | 9/2003 | Villaret et al. |
| 2003/0196066 A1 | 10/2003 | Mathews |
| 2003/0200049 A1 | 10/2003 | Sutton |
| 2004/0044508 A1 | 3/2004 | Hoffman |
| 2004/0122990 A1 | 6/2004 | Meyer et al. |
| 2004/0199786 A1 | 10/2004 | Walmsley et al. |
| 2004/0213027 A1 | 10/2004 | Liu et al. |
| 2005/0086417 A1* | 4/2005 | Meyer et al. .................... 711/5 |
| 2005/0108495 A1 | 5/2005 | McKenney et al. |
| 2005/0177633 A1 | 8/2005 | Plunkett |
| 2005/0182985 A1 | 8/2005 | Shipton et al. |
| 2005/0204058 A1 | 9/2005 | Philbrick et al. |
| 2006/0156269 A1 | 7/2006 | Hoffman, Jr. |
| 2006/0187251 A1 | 8/2006 | Pulver et al. |
| 2006/0271347 A1 | 11/2006 | Hoffman, Jr. |
| 2006/0274112 A1 | 12/2006 | Jackson et al. |
| 2006/0294312 A1 | 12/2006 | Walmsley |
| 2007/0019016 A1 | 1/2007 | Silverbrook et al. |
| 2007/0083491 A1 | 4/2007 | Walmsley et al. |

FOREIGN PATENT DOCUMENTS

| | | |
|---|---|---|
| WO | WO-02084428 A2 | 10/2002 |
| WO | WO-2005038660 A2 | 4/2005 |
| WO | WO-2005038660 A3 | 4/2005 |

OTHER PUBLICATIONS

Mullins, C. S, "", Chapter 5 Application Design, Section "Locking", Database Administration: The Complete Guide to practices and Procedures, (Jun. 14, 2002), 8 pgs.

Saunders, et al., ""Testbench Tutorial, Part 2"", Integrated System Design, http://www.eetimes.com/editorial/1995/hdlcolumn9505.html, (1996), 7 pgs.

* cited by examiner

METHOD AND APPARATUS FOR SENDING DATA FROM MULTIPLE SOURCES OVER A COMMUNICATIONS BUS

CLAIM OF PRIORITY

This application is a continuation of and claims the benefit of priority under 35 U.S.C. §120 to U.S. patent application Ser. No. 10/688,461 filed on Oct. 17, 2003 now U.S. Pat. No. 7,779,212, which is hereby incorporated by reference herein in its entirety.

BACKGROUND

A computer system 100, such as that illustrated in FIG. 1, may include a processor 102, a memory controller 104, and main memory storage 106. Main memory storage 106 includes one or more memory chips, such as Dynamic Random Access Memory (DRAM) chips.

In order for the processor 102 to obtain data from main memory storage 106, the processor 102 sends a data request to the memory controller 104 over a communications bus 108. Memory controller 104 processes and reformats the request, and sends one or more reformatted request messages to main memory storage 106 over a main memory storage bus 110. Main memory storage 106 then returns the requested data to memory controller 104 over the main memory storage bus 110. After receiving the requested data, memory controller 104 then sends the data to processor 102 over the data communications bus 108.

The information and data associated with a particular request is often referred to as a "transaction." At times, memory controller 104 could be processing multiple transactions simultaneously. This can result in a situation where data from multiple sources (e.g., multiple DRAMs within main memory storage 106) are simultaneously available to be returned from main memory storage 106 to the memory controller 104 over the main memory storage bus 110. When this occurs, memory controller 104 performs an arbitration process to determine which source (e.g., which DRAM) will be granted access to the main memory storage bus 110.

Once access is granted, main memory storage 106 places the data associated with a transaction on the main memory storage bus 110 for one or more bus clock cycles, depending on the size of the transaction and the width of the main memory storage bus 110 (e.g., the number of parallel bits). For example, if a transaction includes 52 data bits, and the bus width is 32 bits, two clock cycles would be used to transfer the data on the bus 110. Assuming, for simplicity, that no header information is included, the first 32 bits could be transferred during a first clock cycle, and the last 20 bits could be transferred during a second clock cycle.

The above example illustrates that, during the last clock cycle in which a transaction's data is being transferred on the main memory storage bus 110, the bus 110 often is not completely filled. In this example, only 20 of the 32 available bits are filled during the second clock cycle, leaving 12 bits empty. In current systems, if the main memory storage bus 110 will be granted to another source (e.g., another DRAM) upon the completion of the transaction, these 12 bits would be left empty, and the data for the next transaction would start on the next clock cycle.

The example illustrates that gaps inherently exist on the main memory storage bus 110, using prior art techniques. These gaps result in increased system latency and decreased bandwidth.

SUMMARY

In one embodiment, an electronic system includes a processor, which generates and sends one or more memory access requests, and multiple memory modules. The memory modules are operatively coupled together through a communications bus, and they return data requested in the one or more memory access requests. Each of the multiple memory modules is a data source, and a memory module of the multiple memory modules determines that first source data and second source data are available. It also allocates one or more first contiguous lanes within a first section of a data block to at least some of the first source data, where the data block includes a set of multiple lanes, and each lane includes a set of configurable bits, and allocates one or more second contiguous lanes within a second section of the data block to at least some of the second source data. The second section begins at a next lane, which is contiguous with the first section. The memory module also sends, over the communications bus and during a data block transmission period, at least a portion of the first source data within the first section of the data block, and at least a portion of the second source data within the second section of the data block.

In a further embodiment, a memory module includes one or more memory storage units for storing local data, and a hub, operatively coupled to the one or more memory storage units and to a communications bus over which the hub can receive downstream data from one or more other hubs. The hub determines that first source data and second source data are available. The hub also allocates one or more first contiguous lanes within a first section of a data block to at least some of the first source data, where the data block includes a set of multiple lanes, and each lane includes a set of configurable bits, and allocates one or more second contiguous lanes within a second section of the data block to at least some of the second source data, where the second section begins at a next lane, which is contiguous with the first section. The hub also sends, over the communications bus and during a data block transmission period, at least a portion of the first source data within the first section of the data block, and at least a portion of the second source data within the second section of the data block.

In a further embodiment, an apparatus for assembling and sending data includes means for receiving local data from one or more memory storage units, means for receiving downstream data over a communications bus from one or more downstream data sources, and means for making a determination of how the local data and the downstream data will be sent over the communications bus. Making the determination includes allocating one or more first contiguous lanes within a first section of a data block to at least some of the local data, where the data block includes a set of multiple lanes, and each lane includes a set of configurable bits, and allocating one or more second contiguous lanes within a second section of the data block to at least some of the downstream data, where the first section and the second section are contiguous.

In a further embodiment, an apparatus for sending data over a communications bus includes means for receiving first source data from a first data source, means for receiving second source data from a second data source, and means for sending the first source data and the second source data over the communications bus. Sending the first source data and the second source data includes sending the first source data over the communications bus, identifying a first breakpoint corresponding to an end of the first source data, sending the second source data over the communications bus contiguously with the end of the first source data, and identifying a second breakpoint corresponding to an end of the second source data.

In a further embodiment, a method for sending data on a communications bus includes arranging a first portion of first source data within a data block structure during a first processing period, where the data block structure includes a fixed number of contiguous, configurable bits, and sending the first portion of the first source data over the communications bus. The method further includes arranging a remainder portion of the first source data within a first section of the data block structure during a second processing period, where the first section includes a first set of contiguous bits, arranging a first portion of second source data within a second section of the data block structure during the second processing period, where the second section is contiguous with the first section, and the second section includes a second set of contiguous bits, and sending the remainder portion of the first source data and the first portion of the second source data.

In a further embodiment, a method includes determining that first source data and second source data are available, and allocating one or more first contiguous lanes within a first section of a data block to at least some of the first source data, where the data block includes a set of multiple lanes, and each lane includes a set of configurable bits. The method further includes allocating one or more second contiguous lanes within a second section of the data block to at least some of the second source data, where the second section begins at a next lane, which is contiguous with the first section, and sending, over a communications bus and during a data block transmission period, at least a portion of the first source data within the first section of the data block, and at least a portion of the second source data within the second section of the data block.

In a further embodiment, a method includes arranging first source data from a first source within a first section of a data block structure, where the data block structure includes a fixed number of contiguous, configurable bits, and data within the data block structure is periodically sent out on a communications bus. The method further includes determining that second source data from a second source is available to be sent over the communications bus, and requesting access to the communications bus to send the second source data. The method further includes receiving an indication of where, within the data block structure, at least a portion of the second source data should be placed, arranging at least a portion of the second source data within the data block structure according to the indication, resulting in at least a portion of the second source data occupying a second section of the data block that is contiguous with an end of the first section, and sending the first source data and at least a portion of the second source data over the communications bus during a data block transmission period.

In a further embodiment, a method includes arranging first source data within a first section of a data block structure, where the data block structure includes fixed number of contiguous, configurable bits. The method further includes receiving a request to send second source data over the communications bus, identifying a location of a breakpoint in the first source data, and arranging at least a portion of the second source data within a second section of the data block structure after the breakpoint, where the second section is contiguous with an end of the first section. The method further includes sending the first source data and at least a portion of the second source data over the communications bus during a data block transmission period. Additional embodiments are disclosed, and several embodiments will now be described in more detail.

DETAILED DESCRIPTION

In the following description of the embodiments, reference is made to the accompanying drawings, which form a part hereof and show, by way of illustration, specific embodiments in which the invention may be practiced. These embodiments are described in sufficient detail to enable those skilled in the art to practice the invention, and it is to be understood that other embodiments may be utilized, and that process or mechanical changes may be made, without departing from the scope of the invention. It will be recognized that the methods of the various embodiments can be combined in practice, either concurrently or in succession. Various permutations and combinations will be readily apparent to those skilled in the art.

The various embodiments of the invention, described in detail herein, involve new and novel methods and apparatuses for assembling and sending data. The embodiments of the invention have several significant advantages over prior art methods. Specifically, many embodiments of the invention provide decreased system latency and increased bandwidth when implemented in a memory system in which data from multiple sources is be returned to one or more requesters.

Figure 1:
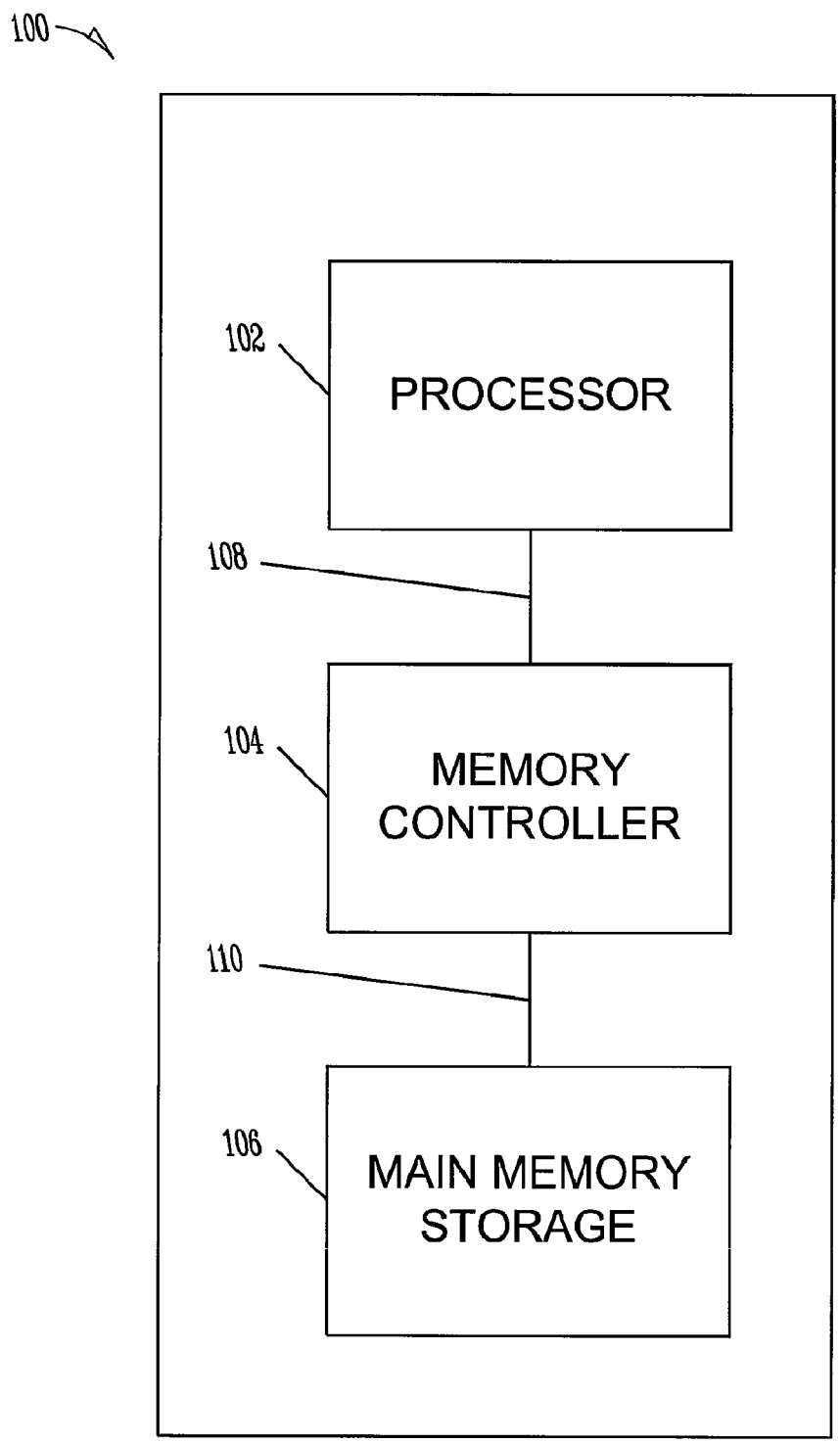
FIG. 1 illustrates a simplified block diagram of a computer system, in accordance with the prior art.
Figure 2:
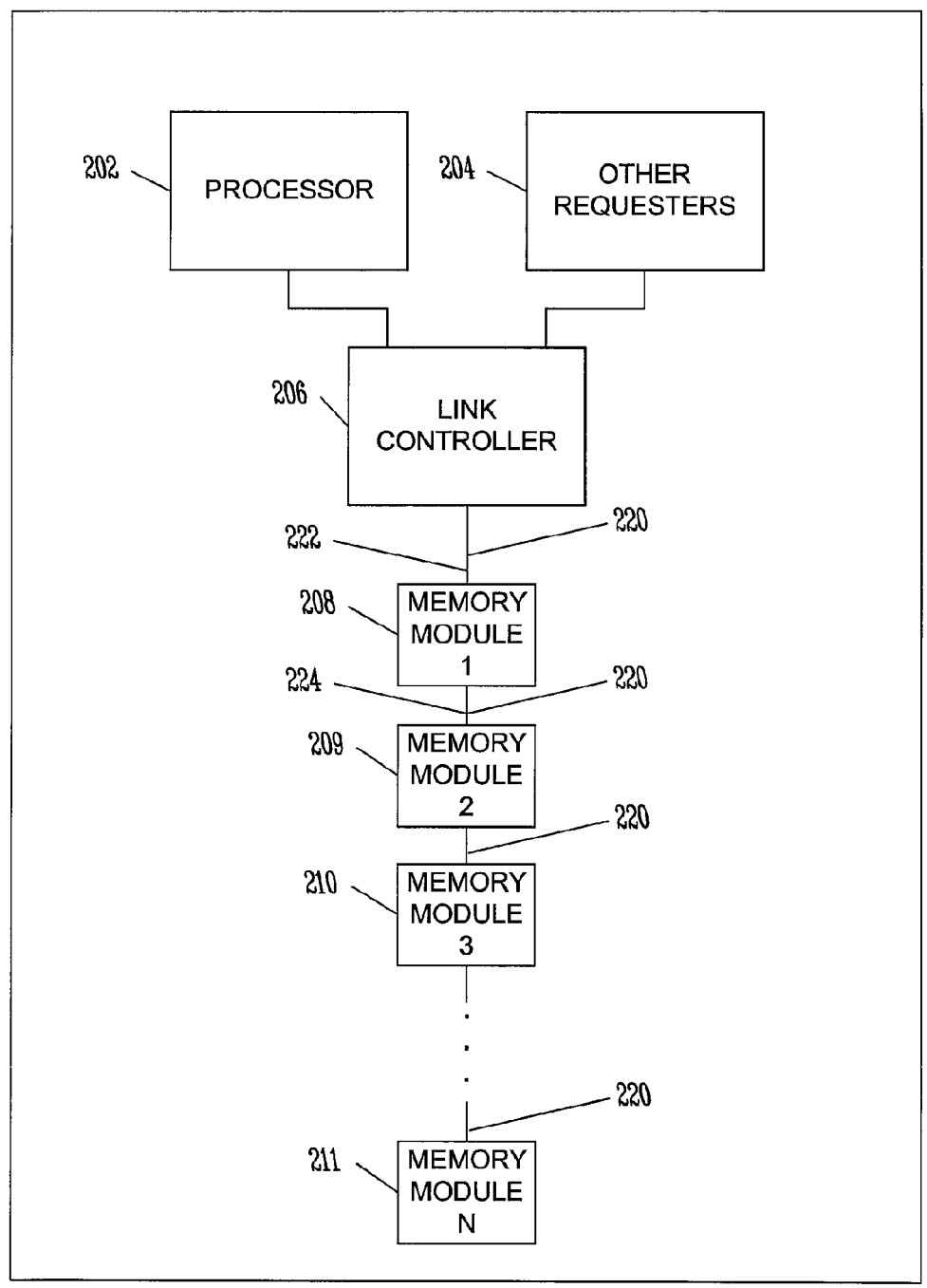
FIG. 2 illustrates a simplified block diagram of a computer system, in accordance with an embodiment of the invention.

FIG. 2 illustrates a simplified block diagram of a computer system 200, in accordance with an embodiment of the invention. In one embodiment, system 200 includes one or more processors 202, a link controller 206, and one or more memory modules 208-211. For ease of description, only a single processor 202 and link controller 206 are illustrated and discussed. However, multiple processors 202 and/or link controllers 206 could exist within a system. Similarly, although four memory modules 208-211 are illustrated, more or fewer memory modules also could exist within a system.

In one embodiment, each memory module 208-211 is located on a separate substrate, such as an insertable printed circuit board. In other embodiments, multiple memory modules could be located on a single substrate, and/or portions of the memory modules could be distributed across multiple substrates. A memory module, in accordance with an embodiment of the invention, will be described in more detail later in conjunction with FIG. 3.

From time to time, processor 202 generates and sends requests for access to information stored within one or more of memory modules 208-211. These "memory access requests" include requests to store data within memory modules 208-211, as well as requests to retrieve data from memory modules 208-211. Besides processor 202, one or more other requesters 204 could be present within the system 200, in one embodiment. For example, the system 200 could include one or more other processors, interfaces, ports, adapters, or other entities which are capable of requesting data. Processor 202 and the one or more other requesters 204 are referred to herein as "request originators."

Each access request is initially processed by link controller 206, which receives the access requests from the request originators 202, 204. For example, but not by way of limitation, link controller 206 could be a North Bridge or some other type of processing element. Based on the content of the request, link controller 206 generates and sends one or more "memory access commands" to one or more of the memory modules 208-211 over a communications bus 220, referred to herein as the "link bus." If a memory access request asks for data to be retrieved (as opposed to stored), the memory modules 208-211 return the requested data to the link controller 206 over the link bus 220, and the link controller 206 routes the requested data back to the request originator 202, 204.

In one embodiment, memory modules 208-211 are operatively coupled together via the link bus 220 in a "tunneled" or "daisy-chained" configuration. In this configuration, link controller 206 is interconnected over the link bus with a first memory module 208. Accordingly, a first part 222 of the link bus 220 interconnects link controller 206 and the first memory module 208. The first memory module 208, in turn, is interconnected over the link bus with a second memory module 209. Thus, a second part 224 of the link bus 220 interconnects first memory module 208 and a second memory module 209, and so on.

In one embodiment, the link bus 220 is a parallel bus. For example, but not by way of limitation, the link bus 220 is 32-bits wide. In other embodiments, the link bus 220 could be wider or narrower than 32 bits, or it could be a serial bus.

The terms "downstream" and "upstream" will be used throughout a remainder of this description. The bottom memory module 211 exists at the furthest downstream end of the link bus 220, and the link controller 206 exists at the furthest upstream end of the link bus 220. Accordingly, data and information that a memory module receives from the direction of the last memory module 211 is considered to be received from a downstream direction. In contrast, data and information that a memory module receives from the direction of the link controller 206 is considered to be received from an upstream direction. Using similar terminology, memory module 211 is considered to be downstream from memory module 210, and memory modules 210 and 211 are considered to be downstream from memory module 209, and memory modules 209-211 are considered to be downstream from memory module 208.

Each memory module 208-210 (except for the lowest memory module 211) provides a tunneled connection to any downstream memory module. When desired, additional memory modules (not shown) could be added downstream from memory module 211, or additional memory modules could be inserted at any other point in the tunnel (e.g., between or above one or more existing memory modules).

In one embodiment, each memory module 208-210 passes each received, memory access command to its next downstream memory module, regardless of the command destination (e.g., the memory module to which the command is addressed). In another embodiment, each memory module 208-210 passes a received, memory access command in the downstream direction only if it is not the destination of the command.

Any type of information received from a downstream direction is referred to herein as "downstream data," which could include data retrieved from memory, headers and other protocol information, and any other type of information received from a downstream memory module. Similarly, the term "upstream data" is used herein to mean any type of information received from upstream direction, and could include memory access commands, data to be stored, headers and other protocol information. The use of the term "data" is not meant to be limited only to actual data that is stored or retrieved. This term is also meant to include headers, other protocol information, commands, and other types of information.

Figure 3:
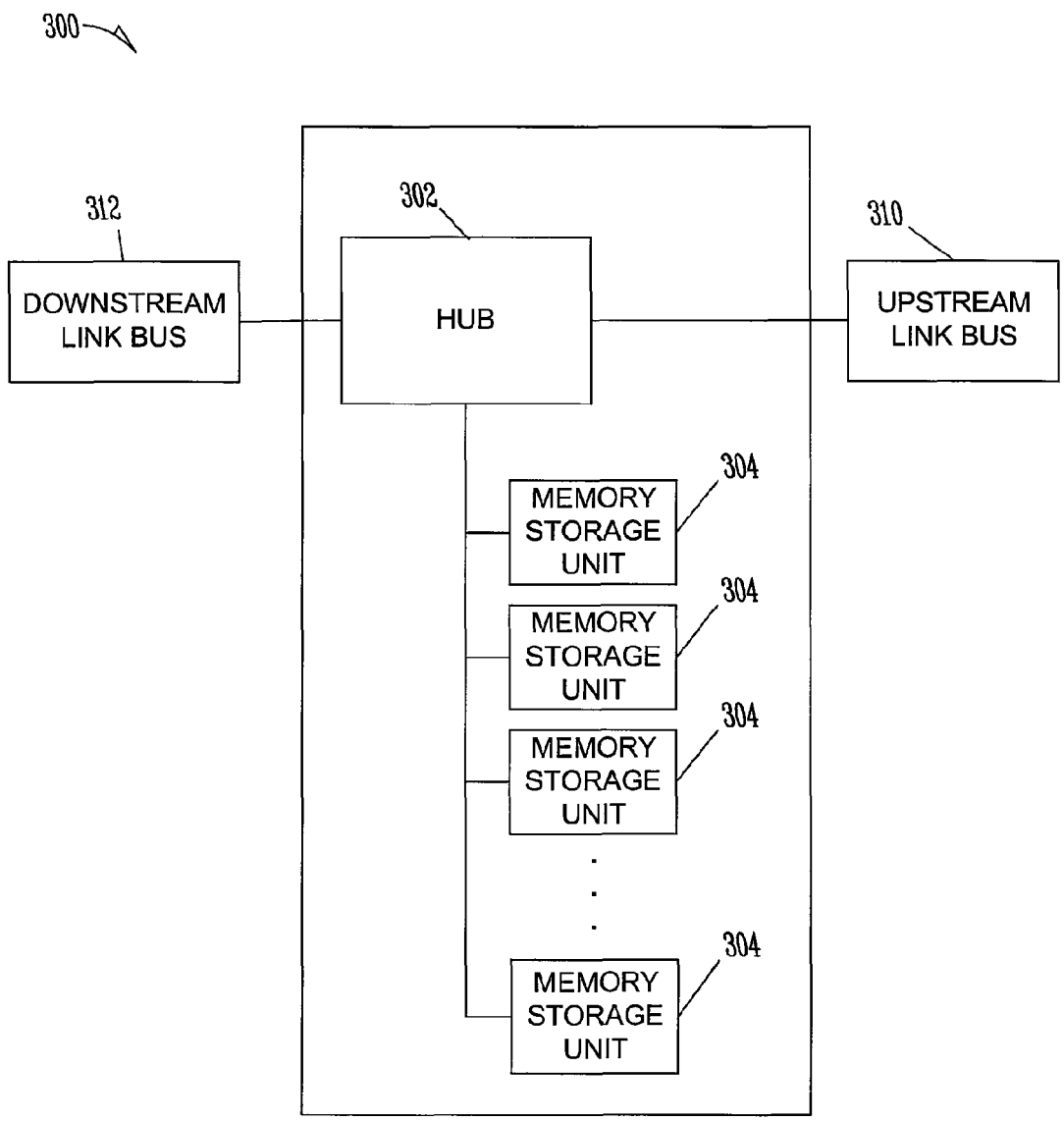
FIG. 3 illustrates a simplified block diagram of a memory module, in accordance with an embodiment of the invention.

FIG. 3 illustrates a simplified block diagram of a memory module 300, in accordance with an embodiment of the invention. In one embodiment, each memory module 300 includes a hub 302 and one or more memory storage units 304. A hub, in accordance with an embodiment of the invention, will be described in more detail later in conjunction with FIG. 4.

In one embodiment, hub 302 and memory storage units 304 are co-located on a single substrate (e.g., a printed circuit board), which is removably connectable to the communications bus. In other embodiments, hub 302 and one or more of the memory storage units 304 could be located on separate substrates, and/or the substrates could be permanently connectable to the bus. Either way, each hub 302 has a set of memory storage units 304 associated with it, and which it may access exclusively. Accordingly, each memory module 300 can be considered a "data source."

Memory storage units 304 could be connected to hub 302 through a common link (as shown), through point-to-point connections, through a daisy chain link, or in some other way. In one embodiment, each memory storage unit 304 is a distinct memory component, such as a dynamic random access memory (DRAM) device, for example. In other embodiments, memory storage units 304 could include other types of memory devices (e.g., read only memory (e.g., ROM, PROM, EEPROM, etc.), flash memory or other memory types). Although four memory storage units 304 are illustrated in FIG. 3, more or fewer units 304 could be included on any memory module 300.

Hub 302 includes one or more application-specific integrated circuits (ASICs), in one embodiment. In another embodiment, hub 302 includes one or more general-purpose or specific-purpose processors. Hub 302 communicates over the upstream link bus 310 to upstream memory modules 208 (FIG. 2) or to link controller 206. In addition, if any downstream memory modules exist, hub 302 communicates over the downstream link bus 312 to downstream memory modules. Accordingly, hub 302 receives data from downstream memory modules on a first part of the bus (i.e., the downstream link bus 312), and sends data toward the link controller 206 on a second part of the bus (i.e., the upstream link bus 310).

In one embodiment, when hub 302 receives a memory access command on the upstream link bus 310, hub 302 retransmits the command on the downstream link bus 312, and stores information regarding the command in a command queue (see element 412, FIG. 4, described later). Hub 302 also determines whether it is the destination of the command. If so, hub 302 makes whatever accesses are necessary to the memory storage units 304 associated with the memory module 300, and sends the requested data on the upstream link bus 310. In addition, hub 302 receives data on the downstream link bus 312 from downstream memory modules (not shown), and hub 302 retransmits that data on the upstream link bus 310.

As the previous paragraph indicates, hub 302 receives data from at least two sources: a) data from the memory storage units 304; and b) data from downstream memory modules. Data retrieved by hub 302 from the memory storage units 304 associated with the hub 302 are referred to herein as "local data." In contrast, data received by hub 302 from one or more downstream memory modules on the downstream link bus 312 are referred to herein as "downstream data." Although the terms "local data" and "downstream data" might be construed to mean that only two data sources exist within the system, the terms are not meant to be so limiting. Data could originate from one or multiple other sources (e.g., one or multiple downstream memory modules or other sources).

An important function provided by hub 302 is to receive both the local data and the downstream data, and to provide both to the upstream link bus 310. In one embodiment, hub 302 receives the local data and downstream data, and sends them on the upstream link bus 310 in a manner that efficiently uses the resources available on the upstream link bus 310. Specifically, the data is merged and sent without causing significant data "gaps" on the bus, where a "gap" includes one or more bits sent over the link bus without valid data, even though valid downstream or local data is available to be returned. The way that this is accomplished is described in detail, in conjunction with the embodiments illustrated in FIGS. 4-8.

Figure 4:
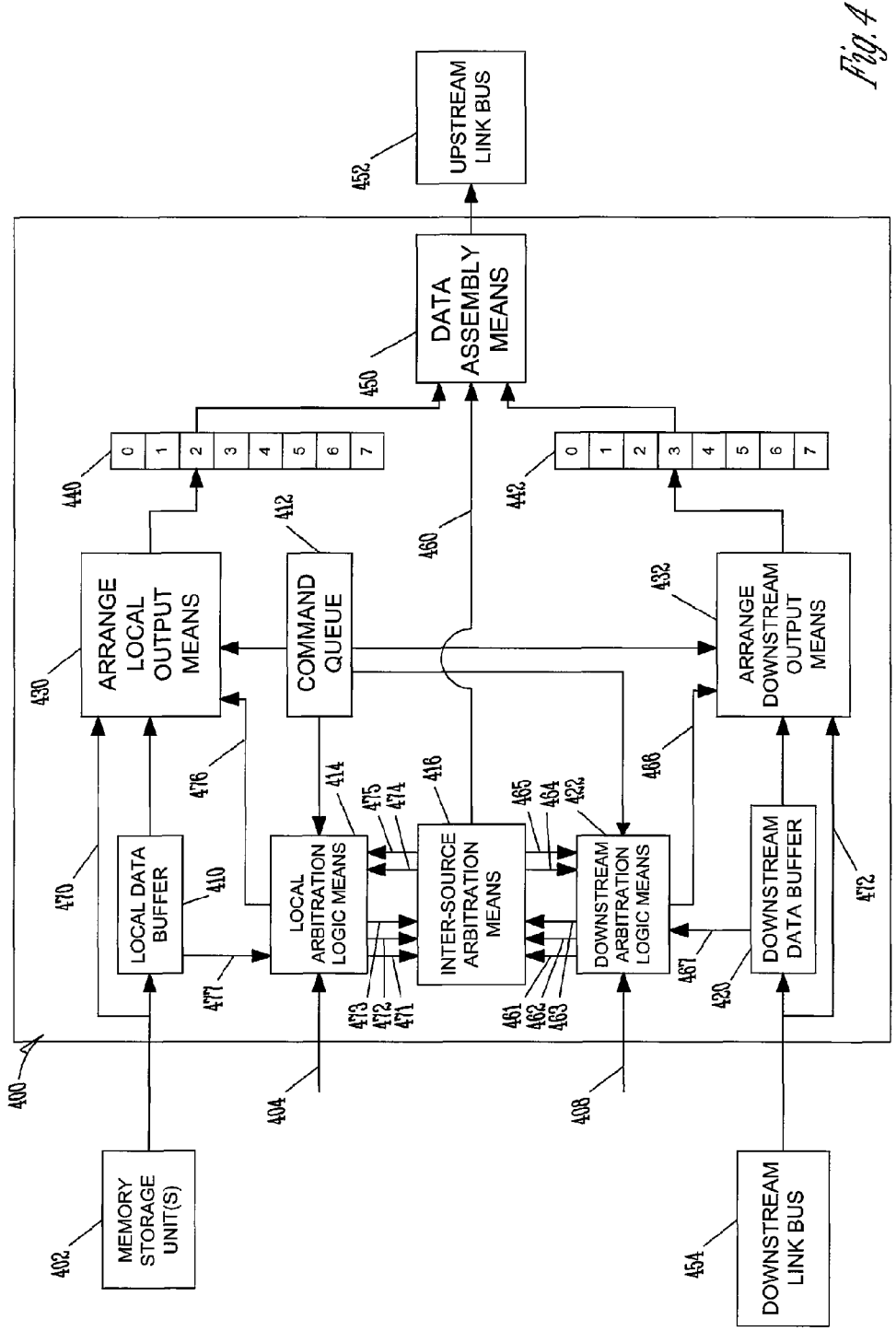
FIG. 4 illustrates a simplified block diagram of a hub, in accordance with an embodiment of the invention.

FIG. 4 illustrates a simplified, functional block diagram of a hub 400, in accordance with an embodiment of the invention. In one embodiment, hub 400 includes various functional elements, which are illustrated as distinct blocks in FIG. 4, for the purposes of illustration. In various embodiments, the actual logic elements and hardware associated with each functional element could be resident in a single ASIC, or could be resident in multiple ASICs and/or other discrete devices. Further, various aspects of the functional elements illustrated in FIG. 4 could be implemented in hardware, software or both.

Briefly, in one embodiment, hub 400 receives local data and downstream data, determines how the data from the two sources will be merged together, and provides the merged data to the upstream link bus 452. The functional components of hub 400 are briefly described in the next paragraph, in accordance with one particular embodiment. Other embodiments and additional details are included in the description that follows.

Hub 400 includes a local data buffer 410 and a downstream data buffer 420, which are used as means to receive and store local data and downstream data, respectively, if necessary. Hub 400 also includes local arbitration logic means 414, downstream arbitration logic means 422, and inter-source arbitration means 416, which operate cooperatively to determine how the local data and downstream data will be sent on the upstream link bus 452. Hub 400 also includes means for arranging local output 430, means for arranging downstream output 432, and data assembly means 450, which function to arrange the local data and the downstream data into a data block structure, in accordance with the determinations made by the arbitration means 414, 416, 422. The data block structure is represented by buffers 440, 442. The data organized into the data block structure is sent on the upstream link bus 452 in a contiguous manner. In addition, hub 400 includes command queue 412, into which the hub stores information relating to received memory access commands.

The data block structure will now be described in more detail. The data block structure (also referred to herein as a "data block") includes a fixed number of configurable bits, in one embodiment. For example, in one embodiment, a data block includes 256 bits. In alternate embodiments, more or fewer bits could be present within a data block. When data is to be sent on the upstream link bus 452, the bits of the data block structure are appropriately configured (e.g., by filling them with a "1" or "0") with data, and the data is clocked out onto the bus during a data block transmission period (i.e., one or more link bus clock cycles, described later).

In one embodiment, the data block is divided into an integer number of contiguous "lanes," where each lane includes a set of configurable bits. For example, in one embodiment, the data block includes a set of 8 lanes. The number of lanes within the data block structure is fixed, in one embodiment, and each lane includes the same number of bits. In other embodiments, the number of lanes could vary, and/or the number of bits per lane could differ from lane to lane. The lane structure is represented in FIG. 4 by buffers 440, 442. Each buffer 440, 442 represents a data block with 8 lanes, labeled "0" through "7". In practice, buffers 440, 442 could be separate buffers, or they could be the same buffer. Buffers 440, 442 are represented separately in FIG. 4 for ease of description.

Using the example of a 256-bit data block and 8 lanes per block, each lane would include 32 bits. Accordingly, lane 0 could be designated as bits 0-31, lane 1 could be designated as bits 32-63, lane 2 could be designated as bits 64-95, and so on, with lane 7 being designated as bits 224-255. In alternate embodiments, more or fewer lanes could be present within a data block. For example, a data block could include as few as two lanes. In other alternate embodiments, lane 0 could include the most significant bits and lane 7 could include the least significant bits, or vice versa, or the bits allocated to each lane could be allocated in a non-sequential manner.

As will be explained in more detail later, the lane structure of the various embodiments enables the hub 400 to efficiently send data over the upstream link bus 452, when data is available from both a local and downstream source. The hub 400 performs several basic processes. First, the hub determines when data from first and second sources (e.g., the local and downstream sources, or vice versa) are received and available. Second, an arbitration process is performed to determine which data will be granted access to the upstream link bus during any particular data block transmission period. Third, a lane filling process is performed to identify which lanes will be utilized by which data during a particular data block transmission period. The lane filling process involves allocating one or more first contiguous lanes within a first section of a data block to at least some of the first source data, and allocating one or more second contiguous lanes within a second section of the data block to at least some of the second source data, where the second section begins at a next lane, which is contiguous with the first section. Finally, the portions of the first source data and the second source data are sent over the communications bus during the data block transmission period.

Referring again to FIG. 4, downstream data is received from the downstream link bus 454. In one embodiment, the downstream data is either placed into a downstream data buffer 420, or is routed to a downstream flythrough path 472. Similarly, local data is received from memory storage unit(s) 402 (e.g., units 304, FIG. 3). In one embodiment, the local data is either placed into a local data buffer 410, or is routed to a local flythrough path 470.

The downstream flythrough path 472 and the local flythrough path 470 are used, in one embodiment, when no downstream or local data remain unsent in the downstream data buffer 420 or local data buffer 410, and when data from only one source is vying for the upstream bus 452. In these situations, the data from either source is simply granted the bus, in order to expedite the return of the data to the requester. In other embodiments, either or both flythrough paths 470, 472 could be excluded from the system, and the local and downstream data could be buffered regardless of the state of buffers 410, 420.

In the interests of more fully describing the lane-packing techniques of the various embodiments, the remainder of the description assumes that multiple sources are vying for the bus, and that local data and downstream data are being temporarily stored in the local data buffer 410 and/or the downstream data buffer 420, respectively, rather than being routed through either flythrough path 470, 472. Accordingly, data from multiple sources are assumed to be available, in much of the description that follows, and the multiple sources are vying for access to the upstream link bus 452.

When downstream data is being received from the downstream link bus 454, a downstream data strobe signal 408 is sent to the downstream arbitration logic means 422. Assuming that the downstream data is being placed into the downstream data buffer 420, a downstream buffer status signal 467 indicates that the downstream data buffer is not empty. When the buffer is not empty, the downstream flythrough path 472 is not used.

Downstream arbitration logic means 422 includes means for generating a bus access request. When the data strobe 408 and buffer status signal 467 indicate that downstream data is available to be sent over the upstream link bus 452, the downstream arbitration logic means 422 sends a downstream request signal 461 to the inter-source arbitration means 416. The downstream request asks the inter-source arbitration means 416 to allow the downstream arbitration logic means 422 to provide its downstream data on the upstream link bus 452.

Similarly, on the local data side, when local data is being received from memory storage unit(s) 402, a local data strobe signal 404 is sent to the local arbitration logic means 414. Assuming that the local data is being placed into the local data buffer 410, a local buffer status signal 477 indicates that the local data buffer is not empty. When the buffer is not empty, the local flythrough path 470 is not used.

Local arbitration logic means 414 includes means for generating a bus access request. When the data strobe 404 and buffer status signal 477 indicate that local data is available to be sent over the upstream link bus 452, the local arbitration logic means 414 sends a local request signal 471 to the inter-source arbitration means 416. Similar to the downstream side previously discussed, the local request asks the inter-source arbitration means 416 to allow the local arbitration logic means 414 to provide its local data on the upstream link bus 452.

Accordingly, in one embodiment, inter-source arbitration means 416 receives requests 471, 461 to access the bus from both local arbitration logic means 414 and downstream arbitration logic means 422. Inter-source arbitration means 416 includes a means for making a determination of how the local and downstream data will be sent over the bus. Accordingly, when multiple requests are pending, means 416 performs an arbitration process, and grants access to the local or downstream data.

Neither the local or downstream arbitration logic means 414, 422 send their data until they have been granted access to the bus. In addition, when the inter-source arbitration means 416 decides to switch a grant from one source to another, the inter-source arbitration means 416 determines and indicates where the next source should start its data, within the lane structure. Inter-source arbitration means 416 uses various information from the downstream and local arbitration logic means 422, 414 to make this determination.

Specifically, in one embodiment, a source that is granted access to the bus predicts where a "breakpoint" in its data will occur, and informs the inter-source arbitration means 416 of the predicted location of the breakpoint. The inter-source arbitration means 416 then uses that predicted location to determine where, within the lane structure, the next granted source may begin to insert its data.

An example will clarify this concept. The example refers also to FIG. 5, which illustrates an example of a timing diagram, in accordance with an embodiment of the invention. Initially, only the internal clock signal 502 and the lane data signals 508-515 will be discussed. The other signals shown in FIG. 5 will be discussed later.

Signal 502 represents an internal clock signal. The internal clock signal is used to define a "processing period" within which each data block is assembled. A processing period refers to a period of time within which a single data block is assembled. Although FIG. 5 illustrates a processing period that is one internal clock cycle long, a processing period may be longer or shorter than one internal clock cycle.

In the given example, the data block includes 8 lanes, and valid data is available in those lanes as indicated by lane data signals 508-515. During a first processing period 540, data is inserted into the lanes 508-515 of the data block structure. Once assembled, that data is made available to the bus. During a next processing period 542, different data is inserted into the lanes 508-515 of the data block structure, and subsequently made available to the bus.

Figure 5:
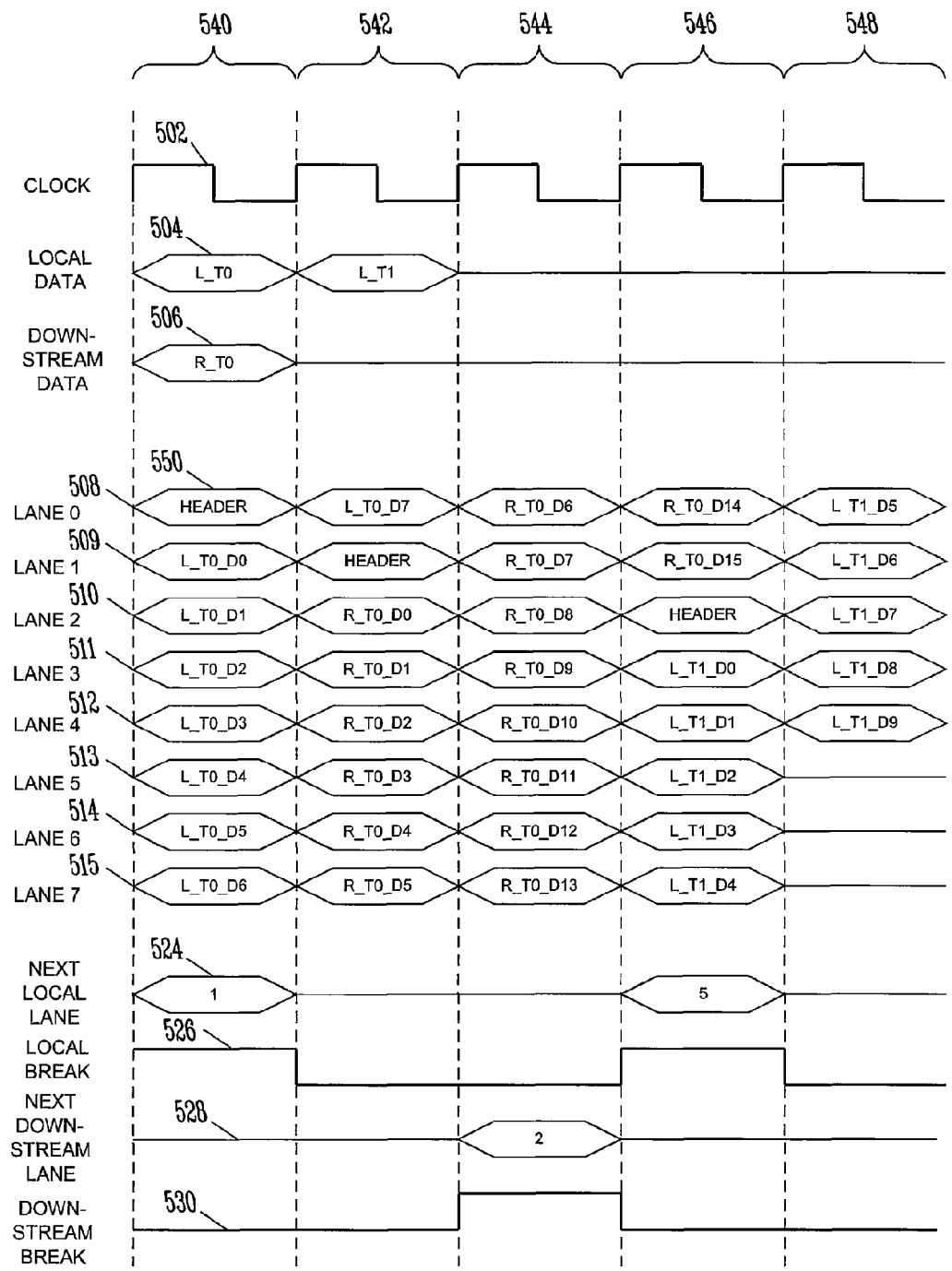
FIG. 5 illustrates an example of a timing diagram, in accordance with an embodiment of the invention.

Further, although the relationship between the various edges of the internal clock (i.e., the rising and falling edges) and the data and other signals is illustrated in one particular way in FIG. 5, this relationship could be different, in other embodiments. For example, the clock signal could be inverted with respect to the other signals. Other modifications could be contemplated as well.

In one embodiment, a particular memory access request is considered a "transaction," and a transaction identifier is associated with the request in order to identify data that is returned. A transaction can be virtually any length. For example, a transaction could be as short as a single bit, or a transaction could be millions of bits long. In one embodiment, the data associated with a transaction is returned as a set of "data fragments," with each fragment including a number of bits that corresponds to the width of a lane. For example, if a transaction includes 256 bits, and each lane is 32 bits wide, then the transaction could be divided into 8 data fragments. A header may be sent along with the data for a transaction, in order to identify the data. A header could be of any length. In the embodiment described below, a header consumes no more than one lane. In other embodiments, a header could consume more than one lane, or a protocol could be used for which a header is not returned for each transaction.

In the example illustrated in FIG. 5, during processing period 540, the first data being transferred includes a header 550, located in lane "0" 508, and a first portion of local data consisting of seven fragments of local data, which are shown in lanes "1-7" 509-515. The symbols included in each data envelope are represented as follows: "L" indicates local data; "R" indicates downstream (or remote) data; "T*" indicates the transaction number; and "D*" indicates the data fragment number for the transaction. Accordingly, the identifier "L_T0_D0" shown in lane "1" 509 indicates that the data within lane "1" during processing period 540 corresponds to the first fragment (D0) of local data (L), for the local transaction identified by "0" (T0). Similarly, the identifier "R_T0_D7" shown in lane "1" 509 during processing period 544 indicates that the data corresponds to the eighth fragment (D7) of downstream data (R), for the downstream transaction identified by "0" (T0).

Because data from the local source exists in the lane structure during the first processing period 540, it is assumed that the inter-source arbitration means (416, FIG. 4) previously granted access to the bus to the local source. In the illustrated example, the local source had eight data fragments to send during the first grant. Because the header 550 consumed lane "0" 508 during the first processing period 540, only seven of the eight data fragments could be assembled during that first processing period 540. The remainder portion of the local source data, consisting of the eighth fragment designated "L_T0_D7," is shown to be placed in lane "0" during the second processing period 542.

The end of the eighth fragment "L_T0_D7" represents a "breakpoint" in the local source data. This breakpoint coincides with the beginning of lane "1" 509 of the second processing period 542. In one embodiment, data from the local or downstream source can be used to fill the remaining lanes "1-7" for the second processing period 542.

In the example, the inter-source arbitration means (416, FIG. 4), granted access next to the downstream source (R). Specifically, the downstream source has a header, and 16 data fragments (D0 through D15) to send during its first transaction (T0). Because the breakpoint occurs at the beginning of lane "1" 509 of the second processing period 542, the header can be placed there. The 16 data fragments follow, as indicated by the indicators "R_T0_D0," in lane "2" 510 of the second processing period 542, through "R_T0_D15," in lane "1" 509 of the fourth processing period 546. Specifically, 6 of the 16 data fragments (R_T0_D0 through R_T0_D5) are placed in lanes 2-7 of the second processing period 542. Thus, during the second processing period 542, a remainder portion of data from a first source is placed in a first section of the data block structure, and a portion of data from a second source is placed in a second section of the data block structure.

The third processing period 544 is consumed entirely by the R_T0 transaction, and no breakpoint occurs during that period. The breakpoint of the downstream transaction does not occur until the beginning of lane "2" 510 of the fourth processing period 546. After the downstream transaction's breakpoint, a header and the first 5 of 10 local data fragments for a second local transaction, designated "T1," are assembled during the fourth and fifth processing periods 546, 548.

As FIG. 5 indicates, data from multiple sources can be placed in the lanes to be sent out during a particular data block transmission period. This is particularly illustrated during processing periods 542 and 546. In one embodiment, if data from a first source (e.g., local data or downstream data) will consume less than all of the lanes, then data from a second source (e.g., downstream data or local data) can be placed in the remaining, unutilized lanes. Accordingly, both first source data and second source data can be sent on the upstream link bus during a single data block transmission period. Said another way, first source data is placed in a first section of a data block, and second source data is placed in a second section of the data block, where the second section begins at a next lane, which is contiguous with the first section. This ability to place data from multiple sources within a same data block, as provided by the embodiments of the invention, result in reduced latency for data return and increased utilization of the link bus bandwidth.

The operation of the embodiment illustrated in FIG. 4 will now be described in more detail in conjunction with the example illustrated in FIG. 5. During the first processing period 540, local data associated with a first local transaction ("L_T0") is indicated as being available by the state of the local data signal 504. In addition, downstream data associated with a first downstream transaction ("R_T0") is indicated as being available by the state of the downstream data signal 506.

Referring also to FIG. 4, the local data signal 504 corresponds to the data stored in local data buffer 410, and the downstream data signal 506 corresponds to the data stored in downstream data buffer 420. When local data strobe 404 indicates that data is available from a local source, the local arbitration logic means 414 sends a bus access request 471 to the inter-source arbitration means 416. Similarly, when downstream data strobe 408 indicates that data is available from a downstream source, the downstream arbitration logic means 422 also sends a bus access request 461 to the inter-source arbitration means 416.

Inter-source arbitration means 416 uses various criteria to determine who will be granted the bus during any given processing period. When inter-source arbitration means 416 decides to grant the bus to a particular source, it sends a bus grant signal to that source. For example, as FIG. 5 indicates, the local data 504 (L_T0) is first granted the bus. Accordingly, inter-source arbitration means 416 sends a bus grant signal 474 to local arbitration logic means 414. In one embodiment, the bus grant signal 474 is sent during the processing period in which the data will actually be placed in the data block (e.g., processing period 540). In other embodiments, the signal 474 could be sent during a previous processing period.

In addition, inter-source arbitration means 416 sends a position indicator, described further below, that enables local arbitration logic means 414 to know in which lane the header or data should first be placed. In one embodiment, inter-source arbitration means 416 sends this indication in the form of a "next lane in" signal 475 to local arbitration logic means 414. In the example of FIG. 5, the "next lane in" for the first processing period 540 is lane "0" 508. Accordingly, lane "0" is the lane into which the local arbitration logic means 414 causes the header for its transaction data to be placed. Local arbitration logic means 414 then arranges its data so that the remaining lanes of the first processing period 540 will be filled with data fragments for its first transaction.

In one embodiment, arrange local output means 430 receives a signal 476 from local arbitration logic means 414, which indicates the next lane in. Arrange local output means 430 then retrieves the header, if one is to be assembled that processing period. In one embodiment, information to be included in the header is retrieved from the command queue 412. In addition, means 430 retrieves the data, from the local data buffer 410. Arrange local output means 430 arranges the header and/or data into a local pre-transmit data block 440, which has the data block/lane structure. For example, if the next lane in is lane "0," then arrange local output means 430 would place the header in lane "0" of the local pre-transmit data block 440, and would place the first seven data fragments (L_T0_D0 through L_T0_D6) in lanes "1" through "7."

Once the grant is issued to local arbitration logic means 414, means 414 predicts the breakpoint of its data. In other words, it determines at which processing period, and in which lane, its data for the transaction will be completed. In one embodiment, this prediction is based on knowledge, by the local arbitration logic means 414, of the transaction size, which was previously stored in the command queue 412. In one embodiment, local arbitration logic means 414 predicts the breakpoint as the end of the entire transaction. In another embodiment, return of the data for a transaction could be performed in multiple parts (e.g., if the transaction exceeds a certain size), and the breakpoint could occur somewhere before the end of the data.

In one embodiment, if the local arbitration logic means 414 predicts that a breakpoint will occur within the next upcoming processing period, then it makes an indication that the breakpoint will occur by sending a local breakpoint indicator signal 472 to the inter-source arbitration means. In addition, means 414 makes an indication of the location of the end of the data, within the data block structure. In one embodiment, this is done by sending an indicator 473 of where, in the lane structure, the breakpoint will occur. These signals correspond to signals 526 and 524, in FIG. 5, respectively.

In the example of FIG. 5, the local data arbitration logic means 414 knows that its transaction size includes 8 data fragments (D0-D7), and thus it determines that it will only need to fill lane "0" 508 of the second processing period 542, in order to complete the transaction. Accordingly, local data arbitration logic means 414 would determine that a breakpoint would be occurring in the next processing period 542.

Using the local breakpoint signal 472 (FIG. 4), 526 (FIG. 5), local data arbitration logic means 414 indicates to the inter-source arbitration means 416 that a breakpoint will be occurring. In the illustrated embodiment, this indication is made by setting signal 472, 526 to a high state. In alternate embodiments, a low setting could be used, or some other type of indication could be made. Because the local breakpoint signal 472, 526 is a binary indication (i.e., either there is an upcoming breakpoint or not), the signal can be represented with a single bit or wire.

In addition, using the next local lane signal 473 (FIG. 4), 524 (FIG. 5), local data arbitration logic means 414 indicates to the inter-source arbitration means 416 where the next breakpoint will occur within the lane structure. In one embodiment, this indication comes in the form of an identification of which lane will first be available, in the next processing period 542. As the example illustrates, the next local lane signal 473, 524 could carry a "1," indicating that lane "1" 509 will be available to another source, if the other source is granted bus access. In another embodiment, the next local lane signal 473, 524 could indicate which lane would carry the last fragment of data for the current transaction (e.g., "L_T0_D7," in the current example). In such an embodiment, the next local lane signal 473, 524 would carry a "0," indicating that lane "0" 508 will carry the last fragment.

Because the next local lane signal 473, 524 indicates the identity of a lane, the number of bits that could be used for the signal 473, 524 is sufficient to make such an indication. In an embodiment that uses 8 lanes, 3 bits of information or wires could be used for the signal 473, 524.

In various alternate embodiments, inter-source arbitration means 416 could receive other types of information that enable it to determine whether a breakpoint will occur in the next processing period, and where that breakpoint will occur. Alternatively, inter-source arbitration means 416 could make either or both of these determinations itself. In still other embodiments, an arbitration means, 414, 416 or 422, could determine and indicate where a breakpoint will occur, even if the breakpoint will occur during a processing period that occurs after the next processing period. Numerous alternate embodiments could be contemplated, and those embodiments are intended to fall within the scope of the present invention.

When inter-source arbitration means 416 determines (via signal 526) that a breakpoint will be occurring in the next processing period 542, means 416 may decide to grant the bus to the same source (i.e., the local source, in the current example) or to another source (i.e., the downstream source, in the current example) during the next period 542. In the example of FIG. 5, inter-source arbitration unit 416 decides to grant the bus to the downstream data 506 (R_T0), which also had a pending request from the first processing period 540. Accordingly, inter-source arbitration unit 416 sends a bus grant signal 464 to downstream arbitration logic means 422. In one embodiment, the signal 464 is sent during the second processing period 542. In another embodiment, the signal 464 could be send earlier (e.g., during the first processing period 540).

In addition, inter-source arbitration means 416 sends a position indicator, which enables downstream arbitration logic means 422 to know in which lane its header or data should first be placed. In one embodiment, inter-source arbitration means 416 sends this indication in the form of the next lane in signal 465 to downstream arbitration logic means 422. The next lane in signal 465 could include a "lane identifier," which is an integer number identifying the lane. For example, in the example where 8 lanes exist within the data block structure, the lane identifiers could be the integer numbers from 0 to 7. In other embodiments, a bit number within the data structure (e.g., a number from 0 to 255 for a 256 bit data structure) or some other indication of the location of the breakpoint could be sent.

In one embodiment, the next lane in signal 465 corresponds to the next local lane signal 524 sent by the previously granted source (e.g., the local source, in this case), during the previous processing period 540. As described previously, the next local lane signal 524 sent by the local arbitration logic means 414 during the previous processing period was a "1", meaning that lane "1" 509 is the first lane available after the breakpoint of the local data.

In other embodiments, the next lane in signal 465 could be a value that is based on the value of the next local lane signal 524, although it may not be exactly the same. For example, but not by way of limitation, the next local lane signal 524 may indicate the last lane that the local data will consume, and the next lane in signal 465 could indicate the first lane that the downstream data should first occupy. In addition, the next local lane signals and next lane in signals could be indicated in a manner other than with a lane identifier. For example, either or both could indicate a bit position, within the data block, or could be indicated in some other manner.

In the example of FIG. 5, the "next lane in" for the second processing period 542 is lane "1" 509, as was indicated during processing period 540. Accordingly, lane "1" is the lane into which the downstream arbitration logic means 422 causes the header for its transaction data to be placed. Downstream arbitration logic means 422 then arranges its data so that the remaining lanes for the second processing period 542 will be filled with data fragments for its first transaction.

Once the grant is issued to downstream arbitration logic means 422, it predicts the breakpoint of its data. In one embodiment, this prediction is based on knowledge, by the downstream arbitration logic means 422, of the transaction size, which was previously stored in the command queue 412. In the illustrated example, the transaction size is 16 data fragments. Accordingly, the breakpoint will not occur during the third processing period 544 (i.e., the next processing period). Instead, the predicted breakpoint occurs in the fourth processing period 546. Further, the downstream data arbitration logic means 422 knows that its transaction size includes 16 data fragments (D0-D15), and thus it determines that it will fill lane "0" and "1" of the fourth processing period 546, in order to complete the transaction.

Referring to processing period 542, the downstream arbitration logic means 422 causes the remaining contiguous lanes to be filled with its header and data fragments. However, because a breakpoint will not be occurring during the next processing period 544, it does not indicate, during processing period 542, via the downstream breakpoint signal 462, 530, that a breakpoint is upcoming. Instead, as is discussed below, this indication is made during processing period 544.

During processing period 544, the downstream arbitration logic means 422 causes the entire data block to be filled with its transaction data (D6-D13). Now, because a breakpoint will be occurring during the next processing period 546, downstream arbitration logic means 422 indicates, via the downstream breakpoint signal 462, 530, that a breakpoint is upcoming. In addition, downstream arbitration logic means 422 indicates, via the next downstream lane signal 463, 528, the location of the breakpoint. As the next downstream lane signal 528 of the example of FIG. 5 indicates, the breakpoint will occur in lane "2" 510 during the fourth processing period 546.

When inter-source arbitration means 416 determines (via signal 530) that a breakpoint will be occurring in the next processing period 546, means 416 may decide to grant the bus to the same source (i.e., the downstream source, in the current example) or to another source (i.e., the local source, in the current example) during the next period 546. In the example of FIG. 5, inter-source arbitration unit 416 decides to grant the bus to the local data 506 (R_T1), which had a pending request from the second processing period 542. The process then continues to repeat itself.

As discussed above, local arbitration logic means 414 and downstream arbitration logic means 422 arrange their data so that the lanes of the data block, for any given processing period, are correctly filled with either local or downstream data. In one embodiment, this is done as follows, using the example of the second processing period 542 (FIG. 5).

Arrange downstream output means 432 receives a signal 466 from local arbitration logic means 414, which indicates the next lane in. Arrange downstream output means 432 then retrieves the header, if one is to be assembled that processing period. In one embodiment, information to be included in the header is retrieved from the command queue 412. In addition, means 432 retrieves the data, from the downstream data buffer 420. Arrange downstream output means 432 arranges the header and/or data into a downstream pre-transmit data block 442, which has the data block/lane structure. For example, if the next lane in is lane "1," then arrange downstream output means 432 would place the header in lane "1" of the downstream pre-transmit data block 442, and would place the first six data fragments (R_T0_D0 through R_T0_D5) in lanes "2" through "7."

As discussed previously, lane "0" of the data block is allocated to the remainder of the data from the local source. Accordingly, arrange local output means 430 would place that remainder data in the local pre-transmit data block 440. Specifically, it would place the last data fragment (L_T0_D7) from the transaction into lane "0" of the local pre-transmit data block 440.

In order to multiplex the data within the pre-transmit data blocks 440, 442, inter-source arbitration means 416 sends a "local/downstream select" signal 460 to data assembly means 450. Data assembly means 450 includes a means for assembling the data and sending the data over the upstream link bus 452 during a data block transmission period.

In one embodiment, the local/downstream select signal 460 is a signal having a number of bits that corresponds to the number of lanes in the data block structure. In the given example, the local/downstream select signal 460 is an eight bit signal, where each bit corresponds to a lane. If a bit is in a first state (e.g., 0) it may indicate to the data assembly means 450 that it should retrieve data from the corresponding lane of the local pre-transmit data block 440, and if the bit is in a second state (e.g., 1), it may indicate that the data should be retrieved from the corresponding lane of the downstream pre-transmit data block 442, or vice versa.

For example, assume the most significant bit of the local/downstream select signal 460 corresponds to lane "0," and the least significant bit of the signal corresponds to lane "7." Assume also that a value of "0" indicates the local source, and a value of "1" indicates the downstream source. For the second processing period 542 (FIG. 5), the local/downstream select signal 460 would have a value of "0 1 1 1 1 1 1 1". For the fourth processing period 546, the signal 460 would have a value of "1 1 0 0 0 0 0 0".

In other embodiments, which bit corresponds to which particular lane could be different. In addition, a value of "1" could indicate the local source and "0" could indicate the local source. In still other alternate embodiments, the data assembly means 450 could determine which source to use for which lane using information that is differently formatted. In still other alternate embodiments, a separate local pre-transmit data block 440 and downstream pre-transmit data block 442 might not be used. Instead, data from the local and downstream source could be placed directly into a single pre-transmit data block (not illustrated). In this embodiment, it may not be necessary to inform data assembly means 450 of the configuration of the lanes (i.e., which source is granted which lane). Instead, data assembly means 450 could simply provide the data in the single pre-transmit data block to the upstream link bus 452.

In one embodiment, the internal clock signal 502 operates at a lower frequency than the link bus clock, and the link bus clock frequency is approximately an integer multiple of the internal clock signal 502 frequency. For example, but not by way of limitation, the internal clock signal 502 could operate at a frequency in the Megahertz (MHz) range, while the link bus clock could operate at a frequency in the Gigahertz (GHz) range. The internal clock and/or the link bus clock could operate at higher or lower data frequencies, as well. In addition, the clocks could operate at approximately the same frequency, in other embodiments.

Each link bus clock cycle, data provided by data assembly means 450 can be sent over the upstream link bus 452. In one embodiment, one data block is sent out over the upstream link bus 452 during a single "data block transmission period," where a data block transmission period could be one or multiple link bus clock cycles long.

For example, and not by way of limitation, assume each data block includes 64 bits of data. If the link bus is 32 bits wide, then two link bus clock cycles could be used to send one data block. In this example, the frequency of the link bus clock could be two times the frequency of the internal clock, assuming that a processing period (e.g., period 540) is one internal clock cycle long, which may not be the case. For example, if the internal clock is operating at 400 MHz, the link bus clock could operate at about 800 MHz.

Using another example, if the data block is 256 bits wide, and the link bus is 16 bits wide, then 16 link bus clock cycles could be used to send one data block. Accordingly, a single data block transmission period would be 16 link bus clock cycles long. In this example, the frequency of the link bus clock could be 16 times the frequency of the internal clock. For example, if the internal clock is operating at 400 MHz, the link bus clock could operate at about 6.4 GHz.

The above examples assume that a number of bits corresponding to the width of the link bus is sent out each link bus clock cycle (e.g., on a rising or falling clock edge). In alternate embodiments, multiple sets of bits could be sent out each clock cycle (e.g., on both the rising and falling clock edges). In these alternate embodiments, the duration of a data block transmission period would be different from the examples given above.

Some of the functions of the local, downstream, and inter-source arbitration logic means 414, 422, 416 could be performed in a manner that can be depicted easily in flowchart form. Therefore FIGS. 6 and 7 are now described, in order to provide further understanding of the various embodiments.

Figure 6:
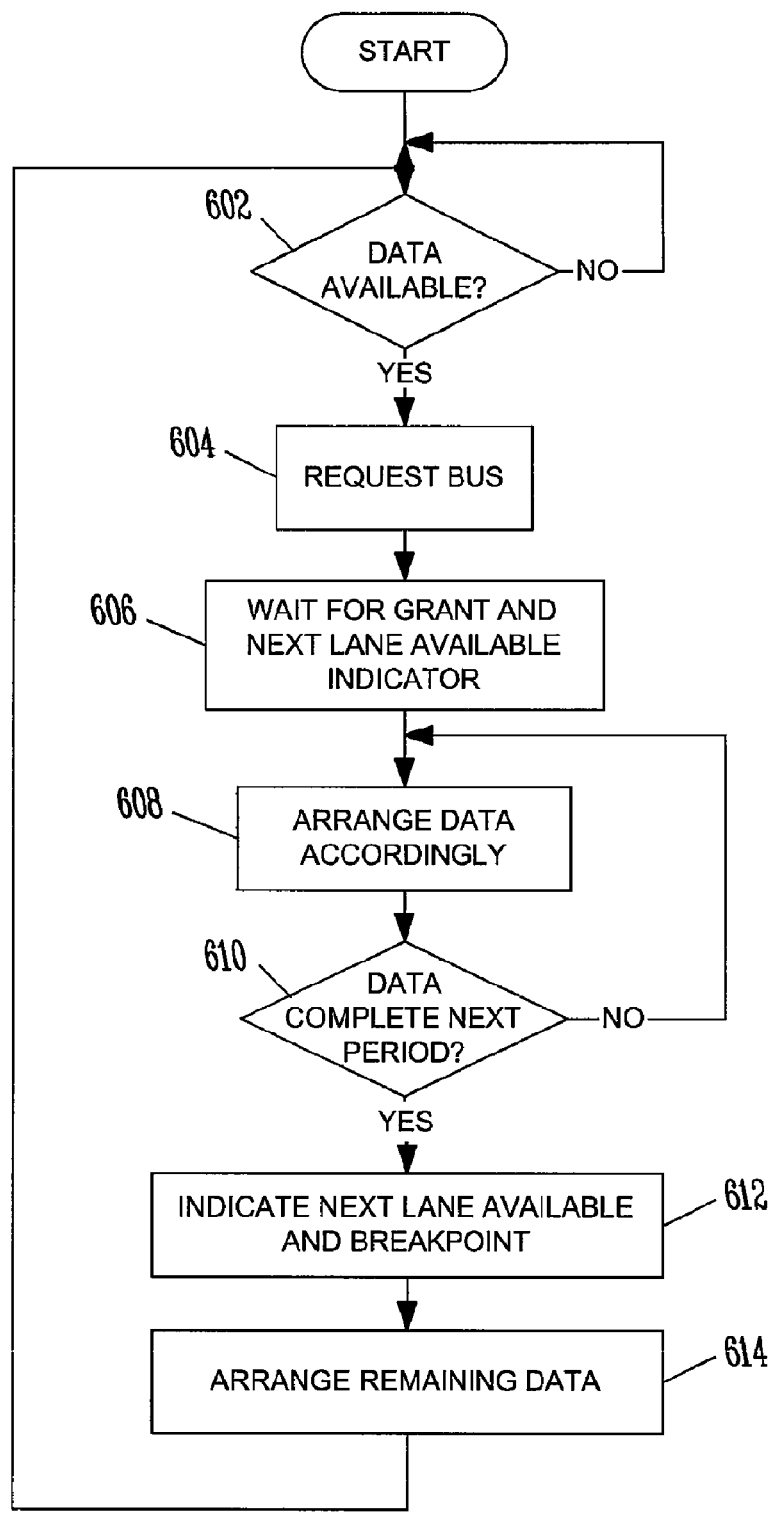
FIG. 6 illustrates a flowchart of a method for requesting access to the bus, in accordance with an embodiment of the invention.
Figure 7:
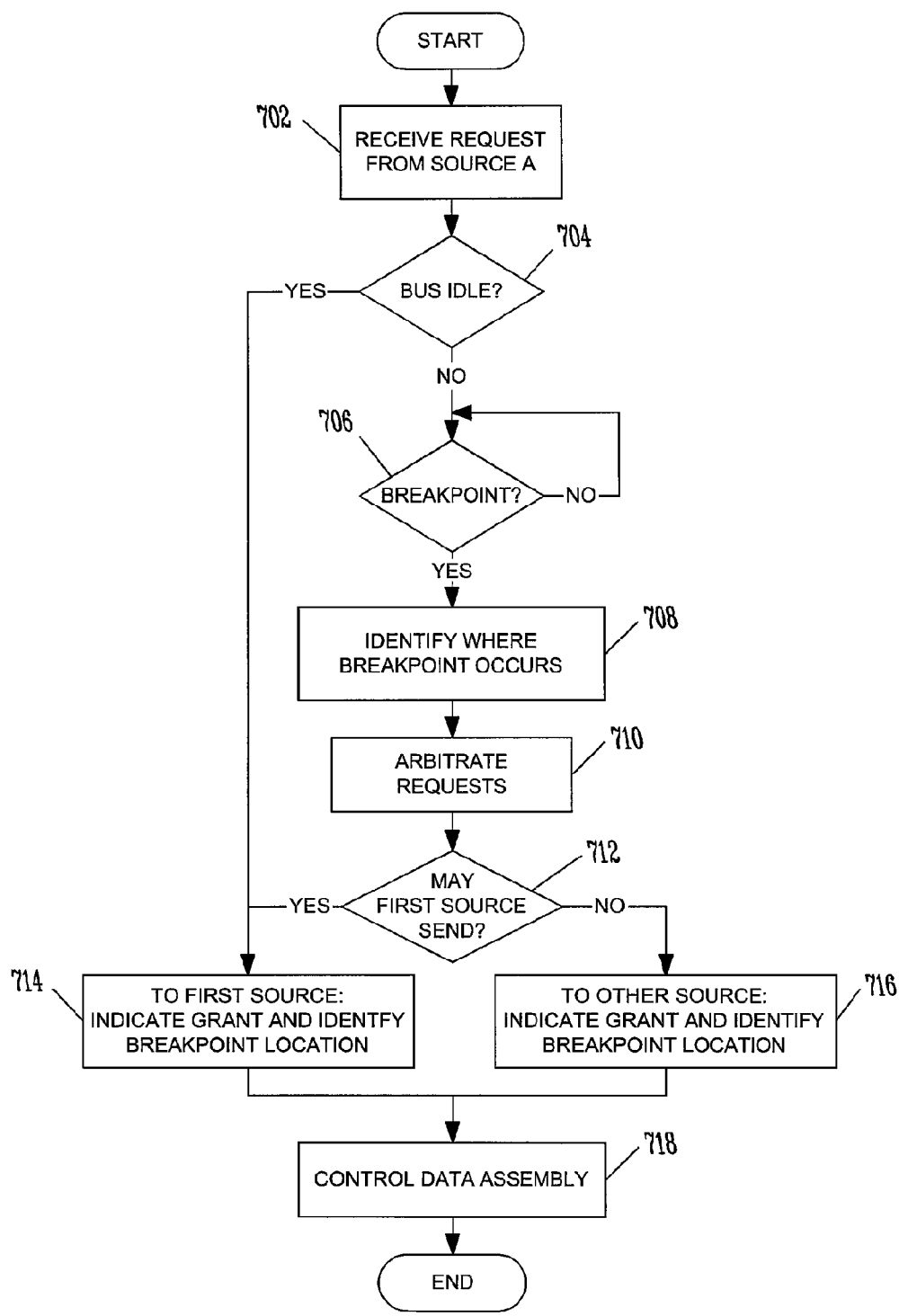
FIG. 7 illustrates a flowchart of a method for granting access to the bus, in accordance with an embodiment of the invention.

FIG. 6 illustrates a flowchart of a method for requesting access to the bus, in accordance with an embodiment of the invention. In one embodiment, all or portions of the method could be performed by local arbitration logic means 414 (FIG. 4) and/or downstream arbitration logic means 422 (FIG. 4). In other embodiments, other functional elements could perform all or portions of the method. For purposes of description, the terms "first source" and "second source" are used to describe an entity requesting access to the upstream bus. These terms are not meant to specifically identify the local or downstream arbitration logic means 414, 422.

The method begins, in block 602, by determining whether data from a first source is available for transmission over the upstream link bus. In one embodiment, this determination can be made from the state of a data strobe signal (e.g., strobe 404, 408, FIG. 4). In another embodiment, the determination could be made from a buffer empty/not empty signal (e.g., signal 477, 467, FIG. 4). The determination could be made in other ways, as well, in other embodiments. If no first source data is available, the method waits.

If first source data is available, then the first source sends a bus access request, in block 604. In one embodiment, the request is sent to the inter-source arbitration means 416 (FIG. 4). The inter-source arbitration means 416 could receive requests from other sources as well, during a particular internal processing period. The inter-source arbitration means 416 is responsible for arbitrating the incoming bus access requests, and granting access.

In one embodiment, the first source waits for a grant indication from the inter-source arbitration means 416, in block 606. In addition, when access is granted, the first source looks for a next lane available indicator from the inter-source arbitration means 416. The next lane available indicator tells the first source where it should begin to place a header and/or data, within the data block being constructed for transmission.

In block 608, the first source then arranges its data within the data block, accordingly. In one embodiment, data is arranged within one or more pre-transmission data blocks (e.g., blocks 440, 442, FIG. 4). During some processing periods, only one source places data within the data block, while during other processing periods, at least two sources place data within the data block.

A determination is made, in block 610, whether the first source's transaction will be completed during the next processing period. If not, then the first source continues to arrange its data within the next data block. Since the transaction will not complete during that processing period, then all lanes of the next data block will be consumed by the first source. The procedure then iterates.

When it is determined that the first source's transaction will be completed during a next processing period, then in block 612, the first source indicates, to the inter-source arbitration unit 416 (FIG. 4), that a breakpoint will occur. In addition, the first source sends an indication of where the breakpoint will occur. For example, the first source could send the identity of the next lane available after the end of the transaction.

During the next processing period, the first source then arranges any remaining data, in block 614, within one or more first contiguous lanes within a first section of the next data block. If no data remains (e.g., if the breakpoint occurred after the last lane of the previous period), then the first source does not place any data within the next data block. The method then repeats.

If the inter-source arbitration unit 416 (FIG. 4) decides to grant the bus next to a second source, then data from the second source will be placed within one or more second contiguous lanes within a second section of the data block, where the second section begins at a next lane, which is contiguous with the first section. Once the data block is completed, the first source data and the second source data are sent over the bus during a data block transmission period (i.e., one or more link bus clock cycles).

FIG. 7 illustrates a flowchart of a method for granting access to the bus, in accordance with an embodiment of the invention. In one embodiment, all or portions of the method could be performed by inter-source arbitration logic means 416 (FIG. 4). In other embodiments, other functional elements could perform all or portions of the method.

The method begins, in block 702, when a bus access request is received from a first source. For example, a bus access request could be made by the local arbitration logic means 414 (FIG. 4) or the downstream arbitration logic means 422 (FIG. 4). At different times, the inter-source arbitration logic means 416 could have from zero to many bus access requests pending, meaning that the requesters had not yet been granted access to the bus.

A determination is made, in block 704, whether the bus is idle. In one embodiment, the bus is considered idle when no other source is currently transmitting on the bus, and no other requests are pending. If the bus is idle, then the inter-source arbitration means 416 may indicate, to the first source, that it is granted access to the bus, in block 714. In addition, the inter-source arbitration means 416 may indicate where a breakpoint will occur (e.g., an identity of the next lane available), in case another source is completing transmission on the bus during that processing period.

In block 718, the inter-source arbitration means 416 (FIG. 4) may then control the assembly and transmission of the data within the data block to be sent. In one embodiment, this is achieved by sending a local/downstream select signal 460 (FIG. 4), to the functional element (e.g., data assembly means 450, FIG. 4) that is responsible for multiplexing and sending the data over the upstream link bus. The method then ends.

Referring back to block 704, if the bus is not idle (e.g., another source is transmitting on the bus, or other requests are pending), then a determination is made whether a breakpoint will occur during the next processing period, in block 706. This determination is made, in one embodiment, by observing a breakpoint signal (e.g., signals 472, 462, FIG. 4) provided by the source that is using the bus. If no breakpoint is upcoming, the method waits.

If a source that is currently using the bus indicates that a breakpoint will occur on the next processing period, then the identity of the location of the breakpoint is determined, in block 708. In one embodiment, the location of the breakpoint is determined by observing a "next lane out" signal (e.g., signals 473, 463, FIG. 4) provided by the source that is using the bus.

In block 710, any pending requests are arbitrated, to determine who will be granted access to use the bus next. The arbitration process can use various criteria in determining who will gain access to the bus.

A determination is made, in block 712, whether the first source may send data over the bus next. If so, then blocks 714 and 718 are performed, which were described above in more detail. The method then ends.

If the first source is not granted access to the bus in block 712, then the inter-source arbitration means 416 may indicate, to another source that has requested access to the bus, that it is granted access to the bus, in block 716. In addition, the inter-source arbitration means 416 may indicate where the breakpoint will occur (e.g., an identity of the next lane available). Block 718 is then performed, and the method ends.

The hub architecture is described as being implemented primarily in hardware, in embodiments described above. In other embodiments, one or more elements of the hub architecture could be implemented in firmware or software, as a series of instructions which, when executed by a microprocessor or other computing device, perform the same function and produce the same result as the embodiments described above. Accordingly, a set of computer-executable instructions for performing the functions of the hub could be stored on a computer-readable medium (e.g., a hard disk, optical or magnetic disk, ROM, RAM, or virtually any other computer-readable medium).

Figure 8:
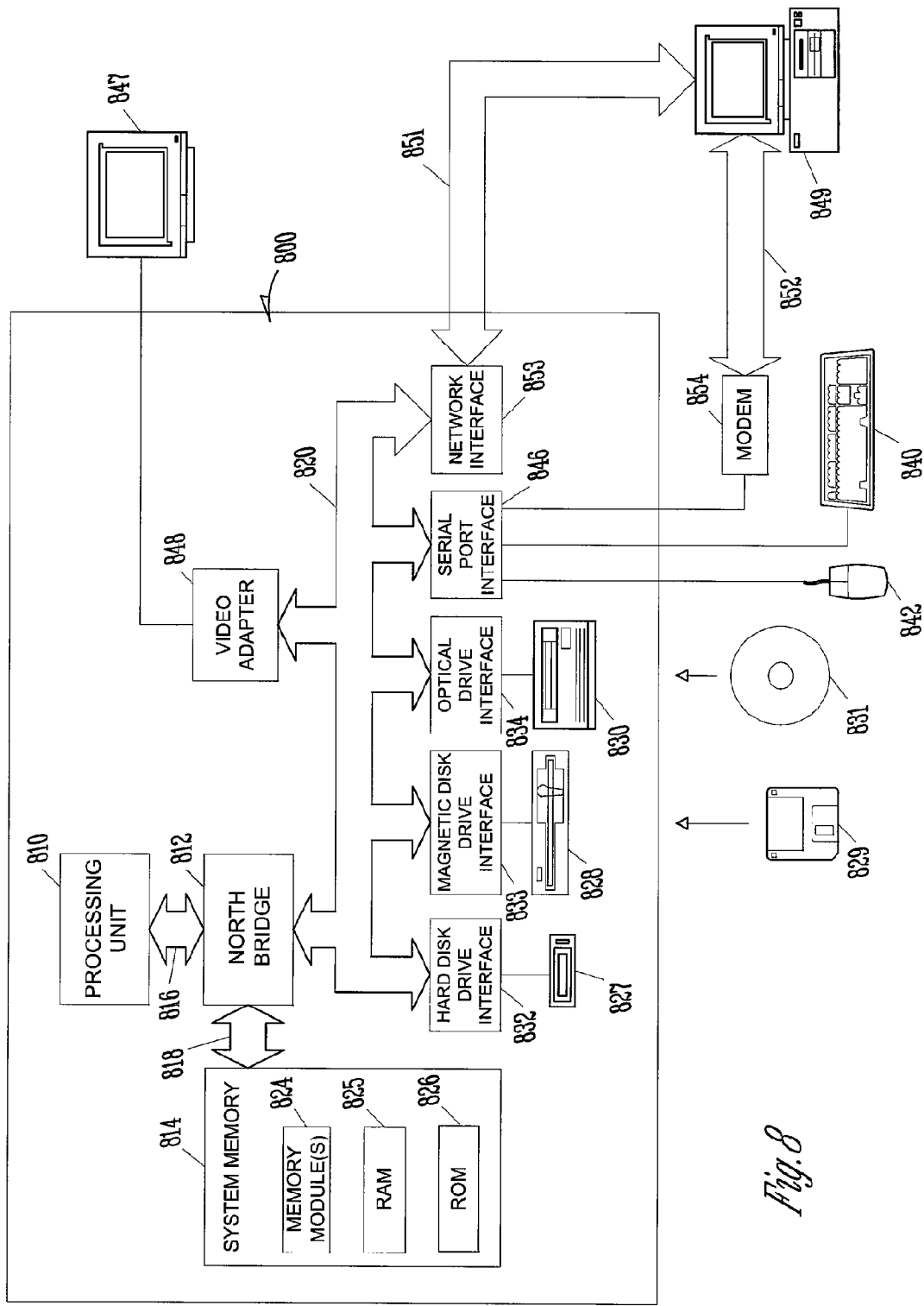
FIG. 8 illustrates an electronic system, in accordance with an embodiment of the invention.

In addition, the hub architecture could be included as a part of an electronic system. FIG. 8 illustrates an electronic system, in accordance with an embodiment of the invention. FIG. 8 and the following discussion are intended to provide a brief, general description of a suitable environment in which embodiments of the invention may be implemented. Those skilled in the art will appreciate that the invention may be practiced with other computer system configurations, including hand-held devices, multi-processor systems, microprocessor-based or programmable consumer electronics, network personal computers, minicomputers, mainframe computers, database computers, and the like.

The system shown in FIG. 8 includes a general purpose computer 800, which includes one or more processing units 810, a North Bridge 812, system memory 814, and a system bus 820, which interconnects various system components, and may be any of several types of bus structures.

The North Bridge 812 acts as an interface between the system bus 820 and the processing unit 810 and system memory 814, in one embodiment. Accordingly, the North Bridge 812 operates as an input/output (I/O) controller and a memory controller. In one embodiment, the North Bridge 812 may contain a link controller, in lieu of a memory controller. The North Bridge 812 communicates with the processing unit 810 over a processor bus 816, and communicates with system memory 814 over a memory bus 818.

The system memory 814 is configured in accordance with an embodiment of the invention. Accordingly, system memory 814 includes one or more memory modules 824 (e.g., modules 208, FIG. 2). Further, system memory 814 could include a link controller (e.g., controller 206, FIG. 2), and/or read only memory (ROM) 825, and/or random access memory (RAM) 826, in various embodiments.

The computer 800 further can include a hard disk drive 827 for reading from and writing to a hard disk, not shown, a magnetic disk drive 828 for reading from or writing to a removable magnetic disk 829, and an optical disk drive 830 for reading from or writing to a removable optical disk 831, such as a CD ROM or other optical media. The hard disk drive 827, magnetic disk drive 828, and optical disk drive 830 can be connected to the system bus 820 by a hard disk drive interface 832, a magnetic disk drive interface 833, and an optical drive interface 834, respectively.

A user may enter requests and information into the computer 800 through input devices, such as a keyboard 840, pointing device 842 or other input devices (not shown). These and other input devices may be connected to processing units 810 through a serial port interface 846 that is coupled to the system bus, or may be connected by other interfaces, such as a parallel port, game port or a universal serial bus (USB). A monitor 847 or other type of display device also may be connected to the system bus 820 via an interface, such as a video adapter 848. In addition to the monitor, the system may also include other peripheral output devices (not shown), such as speakers and printers.

The computer 800 may operate in a networked environment using logical connections to one or more remote computers, such as a remote computer 849. Computer 800 and remote computer 849 may be clients, servers, routers, network personal computers, peer devices or other common network nodes. The logical connections depicted in FIG. 8 include a local area network (LAN) 851 and a wide area network (WAN) 852.

When used in a LAN networking environment, the computer 800 is connected to the local network 851 through a network interface or adapter 853. When used in a WAN networking environment, the computer 800 typically includes a modem 854 or other means for establishing communications over the WAN 852. The modem 854, which may be internal or external, is connected to the system bus 820 via the serial port interface 846. It will be appreciated that the network connections shown are exemplary and other means of establishing a communications link between the computers may be used.

CONCLUSION

Various embodiments of a method and apparatus for assembling and send data packets have been described, along with a description of the incorporation of the embodiments within an electronic system. After reading the description given herein, it will be apparent to those of ordinary skill in the art that modifications could be made to the various embodiments to achieve the same results. In particular, but not by way of limitation, the arrangements and interconnections between various, illustrated functional blocks and method steps could be different, and other and different functional blocks and steps could be used to achieve the same function, in substantially the same way, to achieve substantially the same result. Further, the type of system within which the embodiments are incorporated could be different (e.g., it could include more, fewer or different components than those illustrated and described, or the components could be interconnected in different ways). Further, some or all of the functional components could be implemented in software.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that the various embodiments of this invention be limited only by the following claims and equivalents thereof.

What is claimed is:

1. A method comprising:
arranging first source data within a first section of a data block structure, wherein the data block structure includes a fixed number of contiguous, configurable bits, and wherein the first source data includes local data from at least one memory storage unit of a first memory module;
receiving a request to send second source data over a communications bus, wherein the second source data includes downstream data from a second memory module;
identifying a location of a breakpoint in the first source data;
arranging at least a portion of the second source data within a second section of the data block structure after the breakpoint, wherein the second section is contiguous with an end of the first section, and wherein the local data and the downstream data are assembled into a data block structure to be sent; and
sending the first source data and the at least a portion of the second source data, forming a portion of the data block structure to be sent, over the communications bus during a same data block transmission period.

2. The method of claim 1, wherein the data block structure includes a fixed number of lanes.

3. The method of claim 2, wherein identifying the location comprises identifying a lane that corresponds with a last lane of the first section.

4. The method of claim 2, wherein identifying the location comprises identifying a lane that corresponds with a first lane of the second section.

5. The method of claim 1, further comprising:
predicting where a breakpoint will occur in the second source data.

6. The method of claim 1, wherein data within the data block structure is periodically sent out on a communications bus.

7. The method of claim 2, wherein each lane of the fixed number of lanes includes a same number of bits.

8. The method of claim 7, wherein the first section of the data block structure includes a first set of the fixed number of lanes.

9. The method of claim 7, wherein the second section of the data block structure includes a second set of the fixed number of lanes.

10. A computer-readable medium storing computer-executable instructions that, when executed by a machine, cause the machine to perform a method, the method comprising:
arranging first source data within a first section of a data block structure, wherein the data block structure includes a fixed number of contiguous, configurable bits, and wherein the first source data includes local data from at least one memory storage unit of a first memory module;
receiving a request to send second source data over a the communications bus, wherein the second source data includes downstream data from a second memory module;
identifying a location of a breakpoint in the first source data;
arranging at least a portion of the second source data within a second section of the data block structure after the breakpoint, wherein the second section is contiguous with an end of the first section, and wherein the local data and the downstream data are assembled into a data block structure to be sent; and
sending the first source data and the at least a portion of the second source data, forming a portion of the data block structure to be sent, over the communications bus during a same data block transmission period.

11. The computer-readable medium of claim 10, wherein the data block structure includes a fixed number of lanes, each lane includes a same number of bits, the first section of the data block structure includes a first set of the fixed number of lanes, and the second section of the data block structure includes a second set of the fixed number of lanes.

12. The computer-readable medium of claim 11, wherein identifying the location comprises identifying a lane that corresponds with a first lane or a last lane of the first section.

13. The computer-readable medium of claim 11, wherein identifying the location comprises identifying a lane that corresponds with a first lane or a last lane of the second section.

14. An apparatus for sending data over a communications bus, the apparatus comprising:
a memory module, wherein the memory module is configured to:
receive a first source data from a first data source, wherein the first source data includes local data from at least one memory storage unit of the memory module;
receive a second source data from a second data source, wherein the second source data includes downstream data from a second memory module;
send the first source data and the second source data over the communications bus;
identify a first breakpoint corresponding to an end of the first source data;
send the second source data over the communications bus contiguously with the end of the first source data during a same data block transmission period; and
identify a second breakpoint corresponding to an end of the second source data,
wherein the local data and the downstream data are assembled into a data block structure to be sent, and wherein the structure includes a fixed number of contiguous bits.

15. The apparatus of claim 14, wherein configuration to send the first source data over the communications bus includes configuration to:
arrange a first portion of the first source data within a data block structure during a first processing period, wherein the data block structure includes a fixed number of contiguous, configurable bits; and
arrange a remainder portion of the first source data within a first section of the data block structure during a second processing period, wherein the first section includes a first set of contiguous bits.

16. The apparatus of claim 15, wherein configuration to send the first source data over the communications bus further includes configuration to:
make an indication, during the first processing period, that a breakpoint in the first source data will occur during the second processing period.

17. The apparatus of claim 15, wherein configuration to send the first source data over the communications bus further includes configuration to:
make an indication, during the first processing period, of a location of an end of the first section.

18. The apparatus of claim 15, wherein the data block structure includes a fixed number of lanes, each lane includes a same number of bits, the first section of the data block structure includes a first set of the fixed number of lanes, and the second section of the data block structure includes a second set of the fixed number of lanes.

19. The apparatus of claim 18, wherein configuration to send the first source data over the communications bus further includes configuration to:
    make an indication, during the first processing period, of a lane identifier that corresponds with a last lane of the first section.

20. The apparatus of claim 18, wherein configuration to send the first source data over the communications bus further includes configuration to:
    make an indication, during the first processing period, of a lane identifier that corresponds with a first lane of the second section.

* * * * *

UNITED STATES PATENT AND TRADEMARK OFFICE
CERTIFICATE OF CORRECTION

| | | |
|---|---|---|
| PATENT NO. | : 8,095,748 B2 | Page 1 of 1 |
| APPLICATION NO. | : 12/847801 | |
| DATED | : January 10, 2012 | |
| INVENTOR(S) | : James W. Meyer et al. | |

It is certified that error appears in the above-identified patent and that said Letters Patent is hereby corrected as shown below:

In column 21, line 56, in Claim 10, after "a" delete "the".

Signed and Sealed this
Thirteenth Day of March, 2012

David J. Kappos
*Director of the United States Patent and Trademark Office*